United States Patent
Wu

(10) Patent No.: US 7,055,252 B2
(45) Date of Patent: Jun. 6, 2006

(54) LASER LEVEL WITH ADJUSTABLE LASER PROJECTION LINE

(75) Inventor: Shuming Wu, Nanjing (CN)

(73) Assignee: Chervon International Trading Co., Ltd., Nanjing (CN)

( * ) Notice: Subject to any disclaimer, the term of this patent is extended or adjusted under 35 U.S.C. 154(b) by 334 days.

(21) Appl. No.: 10/706,227

(22) Filed: Nov. 12, 2003

(65) Prior Publication Data

(30) Foreign Application Priority Data

Dec. 27, 2002 (CN) .............................. 02 2 93048

(51) Int. Cl.
*G01B 11/26* (2006.01)
(52) U.S. Cl. ....................................................... 33/286
(58) Field of Classification Search .................. 33/286, 33/227, 276, 278, 281, 282, 283, 285, 290
See application file for complete search history.

(56) References Cited

U.S. PATENT DOCUMENTS

| 4,247,809 A | 1/1981 | Nessel |
| 4,718,171 A | 1/1988 | Schlemmer et al. |
| 4,751,782 A | 6/1988 | Ammann |
| 4,781,457 A | 11/1988 | Hirano et al. |
| 4,830,489 A | 5/1989 | Cain et al. |
| 4,852,265 A | 8/1989 | Rando et al. |
| 4,854,703 A | 8/1989 | Ammann |
| 4,912,851 A | 4/1990 | Rando et al. |
| 4,993,161 A | 2/1991 | Borkovitz |
| 5,075,977 A | 12/1991 | Rando |
| 5,144,487 A | 9/1992 | Hersey |
| 5,148,018 A | 9/1992 | Ammann |
| 5,182,863 A | 2/1993 | Rando |
| 5,218,770 A | 6/1993 | Toga |
| 5,287,627 A | 2/1994 | Rando |
| D348,227 S | 6/1994 | Nielsen et al. |
| 5,331,395 A | 7/1994 | Piske et al. |
| 5,367,779 A | 11/1994 | Lee |
| 5,400,514 A | 3/1995 | Imbrie et al. |
| 5,446,635 A | 8/1995 | Jehn |
| D363,240 S | 10/1995 | Hirakawa et al. |
| 5,459,932 A | 10/1995 | Rando et al. |
| 5,485,266 A | 1/1996 | Hirano et al. |
| 5,500,524 A | 3/1996 | Rando |
| 5,519,942 A | 5/1996 | Webb |

(Continued)

FOREIGN PATENT DOCUMENTS

WO    WO 2003074970 A3    9/2003

OTHER PUBLICATIONS

United Kingdom Search Report under Section 17(5) issued Jun. 11, 2004 in co-pending United Kingdom Patent Application No. GB 0329927.8.

*Primary Examiner*—Christopher W. Fulton
(74) *Attorney, Agent, or Firm*—Wallenstein Wagner & Rockey, Ltd.

(57) ABSTRACT

A laser level with adjustable laser projection line comprises a support bracket, a housing, a switch, a laser generator which project a fanned laser beam to the surface of the work piece to form a line, and wherein a rotating mechanism is coupled to rotate the laser generator thereby causing rotation of the line. There is also a positioning device to position the laser level on an arbitrary surface.

35 Claims, 4 Drawing Sheets

U.S. PATENT DOCUMENTS

| | | |
|---|---|---|
| 5,524,352 A | 6/1996 | Rando et al. |
| D371,309 S | 7/1996 | Webb |
| 5,531,031 A | 7/1996 | Green |
| 5,539,990 A | 7/1996 | Le |
| 5,541,727 A | 7/1996 | Rando et al. |
| 5,561,911 A | 10/1996 | Martin |
| D376,111 S | 12/1996 | Ishii |
| 5,594,993 A | 1/1997 | Tager et al. |
| 5,604,987 A | 2/1997 | Cupp |
| 5,617,202 A | 4/1997 | Rando |
| 5,636,018 A | 6/1997 | Hirano et al. |
| D383,075 S | 9/1997 | Sawaguchi et al. |
| D389,758 S | 1/1998 | Motamed |
| 5,742,387 A | 4/1998 | Ammann |
| 5,745,623 A | 4/1998 | Ohtomo et al. |
| 5,754,582 A | 5/1998 | Dong |
| 5,760,932 A | 6/1998 | Perchak |
| 5,784,792 A | 7/1998 | Smith |
| D396,817 S | 8/1998 | Webb |
| D397,627 S | 9/1998 | Webb |
| D399,145 S | 10/1998 | Ho |
| 5,819,424 A | 10/1998 | Ohtomo et al. |
| 5,836,081 A | 11/1998 | Orosz, Jr. |
| 5,838,431 A | 11/1998 | Hara et al. |
| D402,218 S | 12/1998 | Kennison |
| 5,842,282 A | 12/1998 | Ting |
| 5,864,956 A | 2/1999 | Dong |
| 5,872,657 A | 2/1999 | Rando |
| 5,898,490 A | 4/1999 | Ohtomo et al. |
| D409,508 S | 5/1999 | Gallagher |
| D411,470 S | 6/1999 | Webb |
| 5,907,907 A | 6/1999 | Ohtomo et al. |
| 5,914,778 A | 6/1999 | Dong |
| D411,809 S | 7/1999 | Wakabayashi |
| D412,857 S | 8/1999 | Howard et al. |
| 5,946,087 A | 8/1999 | Kasori et al. |
| D415,436 S | 10/1999 | Martone |
| 5,960,551 A | 10/1999 | Nishi et al. |
| 5,966,826 A | 10/1999 | Ho |
| D416,856 S | 11/1999 | Onose |
| 5,983,510 A | 11/1999 | Wu et al. |
| 5,992,029 A | 11/1999 | Dong |
| D417,633 S | 12/1999 | Sato et al. |
| 6,005,719 A | 12/1999 | Rando |
| D418,432 S | 1/2000 | Krantz |
| D418,433 S | 1/2000 | Krantz |
| D418,434 S | 1/2000 | Krantz |
| D418,763 S | 1/2000 | Krantz |
| 6,009,630 A | 1/2000 | Rando |
| 6,012,229 A | 1/2000 | Shino |
| 6,014,211 A | 1/2000 | Middleton et al. |
| D420,972 S | 2/2000 | Brecher et al. |
| 6,055,046 A | 4/2000 | Cain |
| 6,065,217 A | 5/2000 | Dong |
| 6,073,353 A | 6/2000 | Ohtomo et al. |
| D429,481 S | 8/2000 | Ishii |
| 6,133,996 A | 10/2000 | Plumb et al. |
| 6,151,106 A | 11/2000 | Ohtomo et al. |
| 6,163,969 A | 12/2000 | Jan et al. |
| 6,167,630 B1 | 1/2001 | Webb |
| 6,178,649 B1 | 1/2001 | Wu |
| 6,184,979 B1 | 2/2001 | Hirano et al. |
| 6,195,902 B1 | 3/2001 | Jan et al. |
| 6,202,312 B1 | 3/2001 | Rando |
| 6,209,219 B1 | 4/2001 | Wakefield et al. |
| 6,222,625 B1 | 4/2001 | Johnston |
| 6,249,338 B1 | 6/2001 | Ohtomo et al. |
| 6,262,801 B1 | 7/2001 | Shibuya et al. |
| 6,293,024 B1 | 9/2001 | Fiebig et al. |
| 6,351,890 B1 | 3/2002 | Williams |
| 6,360,446 B1 | 3/2002 | Bijawat et al. |
| D455,664 S | 4/2002 | Webb |
| D457,446 S | 5/2002 | Kallabis |
| 6,407,803 B1 | 6/2002 | Schrank |
| D460,924 S | 7/2002 | Hitchcock |
| D461,135 S | 8/2002 | Watson et al. |
| 6,427,348 B1 | 8/2002 | Webb |
| 6,430,823 B1 | 8/2002 | Seki |
| 6,449,856 B1 | 9/2002 | Matsumoto et al. |
| D464,578 S | 10/2002 | Zurwelle |
| 6,459,483 B1 | 10/2002 | Shafer et al. |
| 6,487,783 B1 | 12/2002 | Thomas, Jr. |
| 6,493,067 B1 | 12/2002 | Kodaira et al. |
| 6,493,955 B1 | 12/2002 | Moretti |
| D469,369 S | 1/2003 | Durkin |
| D469,556 S | 1/2003 | Malard et al. |
| D469,738 S | 2/2003 | Ishii |
| D470,423 S | 2/2003 | Loudenslager et al. |
| D470,424 S | 2/2003 | Hand et al. |
| 6,532,676 B1 | 3/2003 | Cunningham |
| D474,985 S | 5/2003 | Cooper et al. |
| D475,938 S | 6/2003 | Lopano |
| 6,577,388 B1 | 6/2003 | Kallabis |
| D476,584 S | 7/2003 | Zurwelle |
| 6,606,798 B1 | 8/2003 | El-Katcha |
| 6,735,879 B1 * | 5/2004 | Malard et al. ............... 33/286 |
| 6,739,062 B1 * | 5/2004 | Jan et al. ..................... 33/286 |
| 2002/0073561 A1 | 6/2002 | Liao |
| 2002/0166249 A1 | 11/2002 | Liao |
| 2002/0178596 A1 | 12/2002 | Malard |

* cited by examiner

LASER LEVEL WITH ADJUSTABLE LASER PROJECTION LINE

RELATED APPLICATIONS

This application claims priority from Chinese Application No. 02293048.5, filed on Dec. 27, 2002.

FIELD OF THE INVENTION

The present invention relates to an alignment-product which reflects a line on a surface as a positioning reference, and particularly to a laser level which marks a line on a reference surface with the fanned beam projected by a laser generator.

BACKGROUND OF THE INVENTION

There are many kinds of laser alignment devices, which project laser beams by laser generators to mark lines. One such device is designed by U.S. Tool Co. (U.S. Patent Application Publication No. US2002/0178596A1), which can project a line of fixed orientation. Another such device is marketed by U.S. CTB/Berger, which can project a horizontal line and a plumb line decussate to each other on walls perpendicular to the direction of propagation of the laser. The former can merely project a line parallel to the baseplane of its pedestal; the latter can form two lines vertical with each other, but there is a disadvantage that two laser generators are needed, and as the switch is turned on, required or not, the two laser generators project beams simultaneously, thereby causing much more power consumption.

SUMMARY OF THE INVENTION

It is an object of the present invention to provide a laser level with only one laser generator which can be rotated 90 degrees to alter the location relationship of the laser beam with the base plane of the laser level.

Another object of the present invention is to provide a means to mount the laser level on a metallic surface.

A further object is to provide a separate base plate which can protrude a plurality of retractable pins to suspend and hold the laser level on a surface of plastic, cork, wood, drywall or other soft object.

An even further object of this invention is to provide one or more level bubbles to indicate whether the laser beam is horizontally or vertically level.

To achieve the objects hereinbefore, the laser alignment device of the present invention includes a support bracket, a clamshell housing defined by a left clamshell housing member and a right clamshell housing member, a laser generator, a battery to power the laser generator, a cover for a battery pack, a switch, a protective door and a rotating mechanism. The protective door is used to activate the trigger of the linked switch. The laser generator will be switched off when the door is closed, and the lens of the laser generator will be protected against dust. When the door is opened, the switch connects the laser generator to the power supply and the laser generator will project a fan-shaped laser beam to form a line on a surface.

The rotating mechanism includes a knob which can rotate from 0 to 90 degrees, and which is coupled to the laser generator to rotate the laser generator when the knob is turned, thereby causing rotation of the line on the plane.

There may be a magnetic attachment means on the base of the support bracket. When it is necessary to secure the laser level on a surface of a metallic object (e.g., a pipe or metal stud) one needs only to place the laser level with adjustable laser projection line onto the metallic object, and the laser level will be held there via the magnetic attachment means. In this manner, the laser level can be positioned on a non-horizontal plane in a realtively secure position, and avoid instability.

The laser level with adjustable laser projection line also includes a separate removable mounting baseplate having two or more retractable pins which can be extended from the removable mounting baseplate and inserted into the wall, wood, plastic or other soft object as desired. When not in use, the pins can retract into a cavity in the removable mounting baseplate.

The laser level with adjustable laser projection line can be powered by an internal battery. The user need only screw the cover off without the aid of a tool to remove the discharged battery cells and fill in new battery cells to power the laser generator.

The laser level can further comprise two conventional level bubbles which are perpendicular to each other on the top of the laser level. The two level bubbles are both parallel to the bottom of the laser level, for orientation or leveling a precise horizontal line or plumb line.

The laser level with adjustable laser projection line disclosed by the present invention can expediently mark a reference line accordingly on a workpiece as needed. The reference line can be parallel, vertical or be adjusted to other angular degrees to the bottom of the laser level.

DETAILED DESCRIPTION OF THE DRAWINGS

Figure 1:
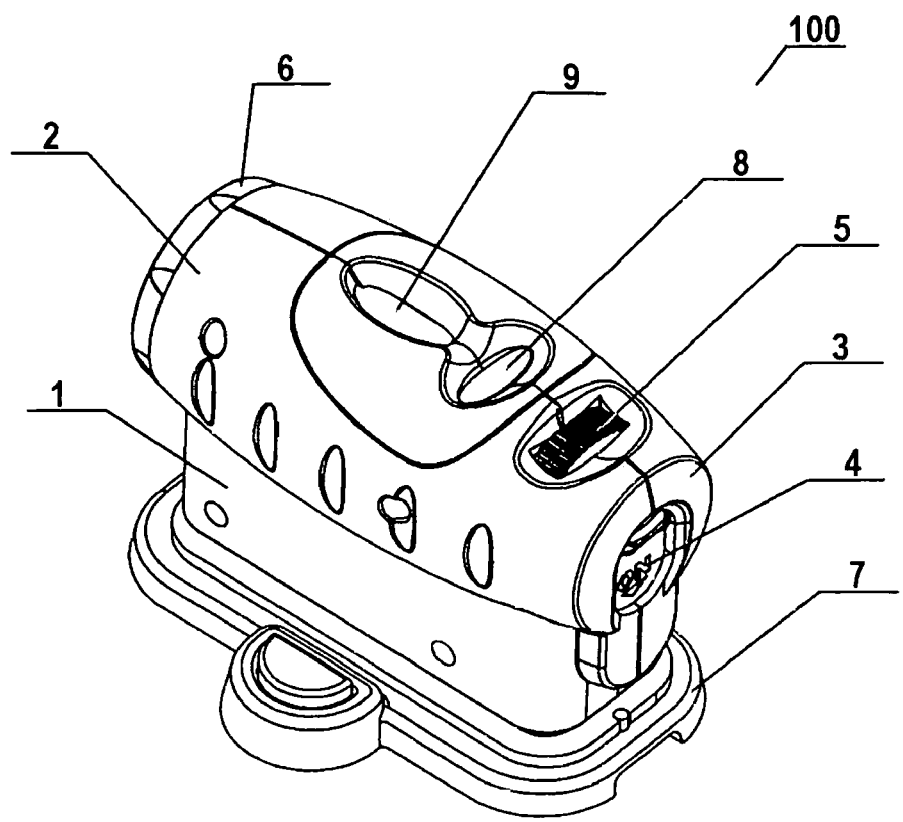
FIG. 1 illustrates a perspective view of a preferred embodiment of a laser level with adjustable laser projection line according to the present invention.
Figure 2:
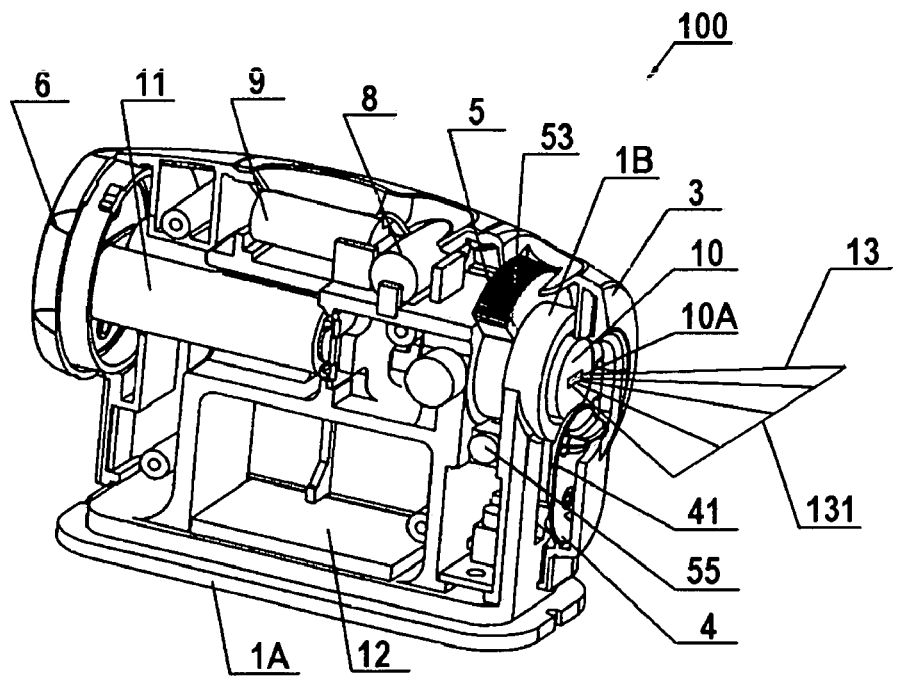
FIG. 2 is an inner perspective view of the laser level of FIG. 1 with left clamshell housing member removed.

Referring to FIGS. 1 and 2, the laser level with adjustable laser projection line 100 of the present invention comprises a support bracket 1, a left clamshell housing member 2, a right clamshell housing member 3, a laser protection door 4, a laser generator 10 mounted on the front bracket 1B of the support bracket 1, a battery pack 11 or power supply to power the laser generator 10, a switch 41 to control the laser generator 10 and a cover 6 for the battery pack. The protective door 4 can trigger the switch 41 when it is opened or closed, as shown in FIG. 1. As the door 4 is in the closed position, it slides the switch 41 to the off position and switches off the laser generator 10. The closed door 4 also protects the laser generator 10 and lens 10A against dust. When the door 4 is pushed downwardly to access lens 10A of the laser generator 10, as shown in FIG. 2, the door 4 slides the switch 41 to the on position at the same time, switching on the laser generator 10 to project a fan-shaped laser beam 13 and form a line 131 on the surface to be illuminated.

Figure 3:
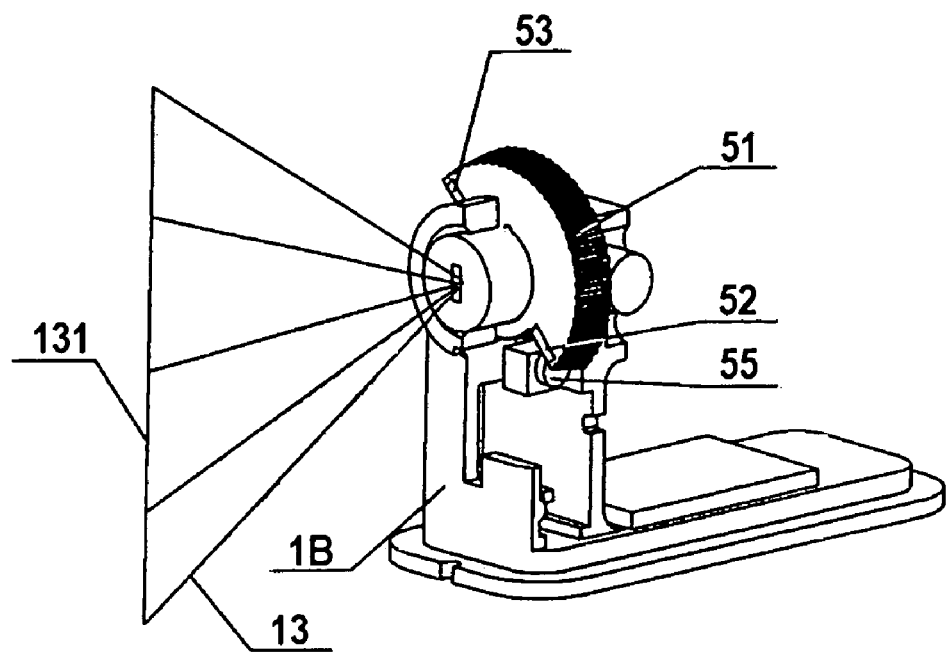
FIG. 3 is a sectional view of the mechanism for rotating the laser when the mechanism is rotated to its right limit with the laser beam perpendicular to the bottom plate of the laser level.
Figure 4:
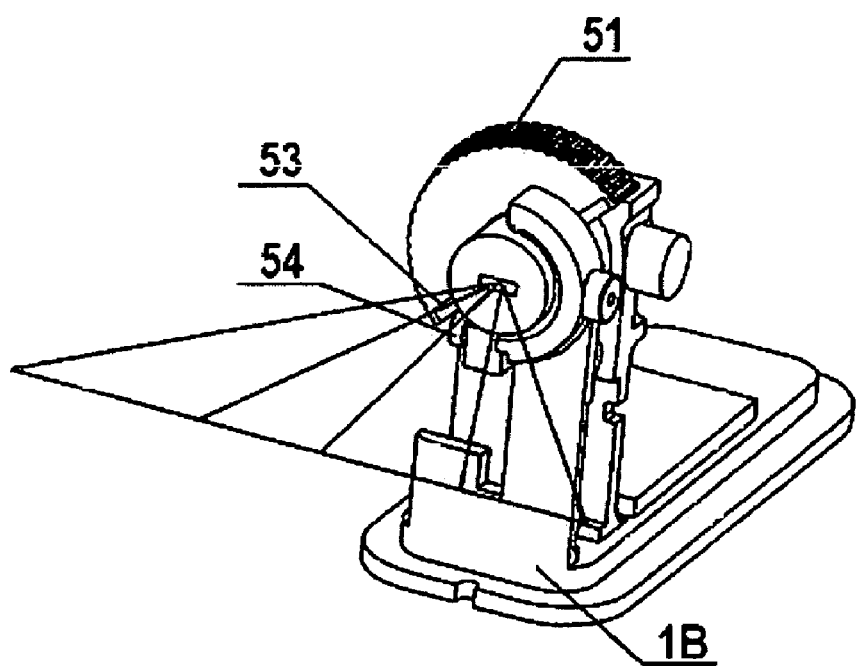
FIG. 4 is a sectional view of the rotating mechanism when it is rotated to its left limit with the laser beam parallel to the bottom plate of the laser level.

Referring now to FIGS. 3 and 4, the laser generator 10 in the laser alignment device 100 of the present invention includes a rotating mechanism 5, which can have a knob 51 secured on the laser generator 10 which will rotate along with the rotation of knob 51. When knob 51 is turned clockwise to its limit, the planar beam projected by the laser generator 10 will be parallel to the bottom of laser level 100 (FIG. 4); and, when knob 51 is turned counterclockwise to its limit (the angular degree of rotation preferably being 90 degrees), the planer beam projected by the laser generator 10 will be perpendicular to the bottom of the laser alignment device 100 (FIG. 3). To avoid knob 51 from rotating arbitrarily and affecting the stability of the laser beam position accordingly, it is preferred to arrange two magnetic members 52, 53 on knob 51, and arrange two fastening members 54, 55 on the corresponding position of the front bracket 1B. When the knob 51 being rotated to its clockwise limit, the fastening member 54 is caught by the magnetic member 53; and when knob 51 rotates to its counterclockwise limit, the fastening member 55 is caught by the magnetic member 52, ensuring the position of knob 51 and thereby maintaining the stability of the laser beam position.

Referring to FIGS. 1 and 2, the laser alignment device 100 of the present invention may advantageously comprise one or more leveling devices such as bubbles 8, 9 to orientate or level the laser level 100 on a horizontal or vertical plane. The leveling bubbles 8, 9 are parallel to the bottom of the laser level 100. Bubble 8 is used to level the horizontal relationship of the elongated side position of the laser level with adjustable laser projection line 100, and bubble 9 is used to level the horizontal relationship of fore-and-aft position of the laser level 100. Thus, laser level 100 can provide accurate horizontal lines and plumb lines with the usage of the level bubbles 8, 9.

The laser level with adjustable laser protection line 10 as described above can also be used on a horizontal position for a metallic surface. To solve this problem, as shown in FIG. 2, a magnet 12 is mounted on the base 1A of the support bracket 1 of the laser level 100, thereby allowing laser alignment device 100 to be placed and held on an arbitrary portion of the metallic surface.

Figure 5:
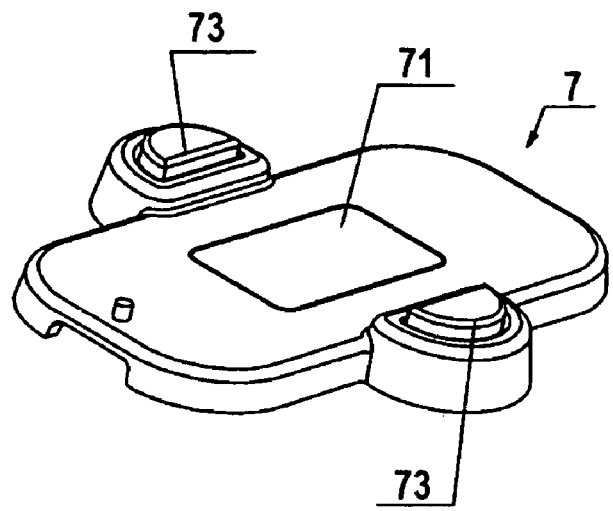
FIG. 5 is a sectional view of the removable base plate.
Figure 6:
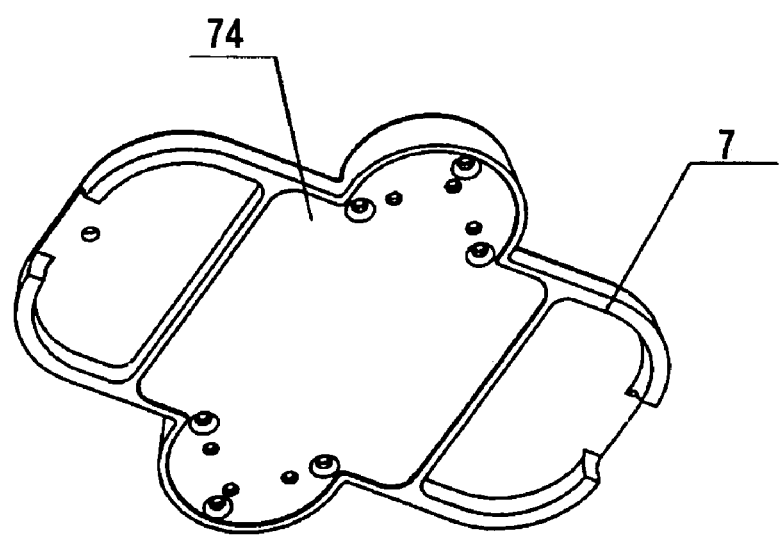
FIG. 6 is a sectional view of the removable base plate wherein the positioning pins are retracted inside the removable base plate.
Figure 7:
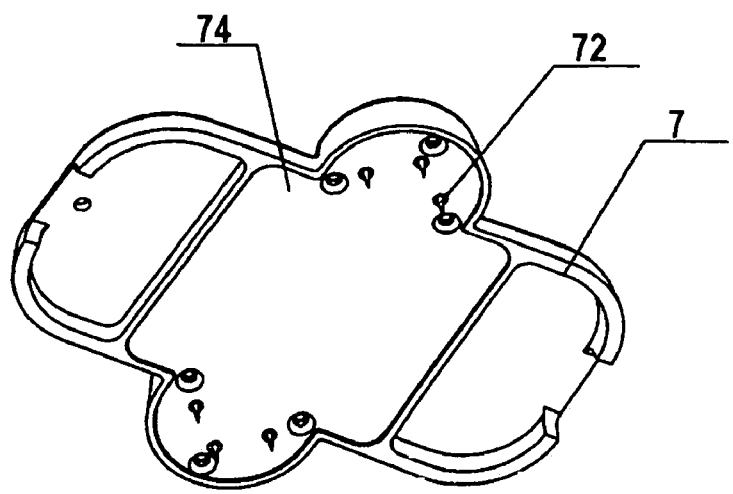
FIG. 7 is a sectional view of the removable base plate wherein the positioning pins protrude outward.

To position laser level 100 on a wood, plastic, drywall or other surface, as shown in FIG. 1, a removable baseplate 7 may be used with the laser level 100 for mounting. As shown in FIG. 5, the baseplate 7 comprises two pushpads 73 each including at least one retractable positioning pin 72. In the embodiment shown in FIGS. 5–7, there are three retractable pins 72 on each pushpad 73. When pushpads 73 are relaxed, the retractable pins 72 are retracted within the removable mounting baseplate 7, as shown in FIG. 6, thus preventing the operator from being stabbed carelessly. When pushpads 73 are pressed down, the positioning pins 72 will extend outwardly from the bottom 74 of the mounting baseplate 7 as shown in FIG. 7. The mounting baseplate 7 can be mounted to the surface of a wall (drywall, plastic, plaster or other surface) by inserting the retractable pins 72 into the surface. The laser level 100 can then be attached to the mounting baseplate 7 by placing the magnet 12 on the bottom of the laser level 100 to a metallic attachment surface 71 on the mounting baseplate 7 thereby fastening the laser level 100 to the baseplate 7.

Figure 8:
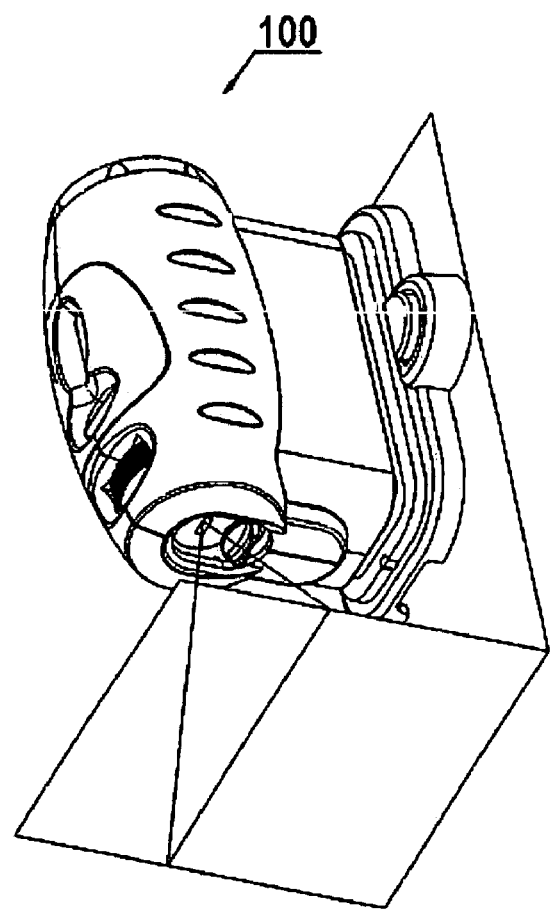
FIG. 8 is a perspective view of the laser level with adjustable laser projection line when it is positioned and held on a vertical plane.

FIG. 8 is a perspective view of the laser alignment device 100 when it is situated on the vertical plane with the laser beam projecting downwardly.

I claim:

1. A laser level with adjustable laser projection line, comprising:
   a housing;
   a laser assembly having a laser generator and a lens;
   a rotating mechanism connected to one of either the laser generator or the lens;
   a stop that cooperates with the rotating mechanism to define a first operating position and a second operating position;
   a power supply;
   a switch for connecting the power supply to the laser generator;
   wherein the laser generator projects a laser beam through the lens to project a line on a surface to be illuminated, and when the rotating mechanism is in the first position the line is projected vertically on the surface and when the rotating mechanism is in the second position the line is projected horizontally on the surface.

2. The laser level with adjustable laser projection line of claim 1, further comprising a protective door connected to the switch, the protective door being moveable from a first open position to a second closed position, wherein when the protective door is in the first open position the switch is connected to the power supply to the laser generator and when the door is in the second closed position the switch is disconnected to the power supply.

3. The laser level of claim 1, wherein the housing has an opening, and wherein the laser generator projects a fan-shaped laser beam outside of the housing through the opening.

4. The laser level of claim 1, wherein the rotating mechanism comprises a knob and the stop comprises at least one magnetic member and two corresponding fastening members that can be engaged by the magnetic member.

5. The laser level with adjustable laser projection line of claim 1, further comprising a mounting baseplate removably connected to the housing.

6. The laser level with adjustable laser projection line of claim 5, wherein the baseplate has two pushpads each of which comprise at least one retractable pin, the pins protruding from a bottom of the baseplate when the pushpads are depressed.

7. The laser level with adjustable laser projection line of claim 1, further comprising a base that has a magnet, the base being connected to the housing.

8. The laser level with adjustable laser projection line of claim 7, wherein the base is coupled to a removable mounting baseplate.

9. The laser level with adjustable laser projection line of claim 8, wherein the baseplate has two pushpads each of which comprise at least one retractable pin, the pins protruding from a bottom of the baseplate when the pushpads are depressed.

10. A laser generating device comprising:
   a housing having a base; and,
   a laser generating assembly disposed within the housing for projecting a fan-shaped laser beam through an opening in the housing to form a line on a workpiece, a portion of the laser generating assembly being coupled to a rotating member protruding from the housing such that when the rotating member is turned clockwise to its limit, the line on the workpiece will be one of either substantially vertical or substantially horizontal, and when the rotating member is turned counterclockwise to its limit, the line on the workpiece will be the other one of either substantially vertical or substantially horizontal.

11. The laser generating device of claim 10, further comprising a magnetic member depending from the base of the laser generating device.

12. The laser generating device of claim 10, wherein the rotating member comprises a knob.

13. The laser generating device of claim 10, wherein the laser generating assembly is mounted on a bracket in the housing, the rotating mechanism has first and second magnets attached thereto, and the bracket has first and second positioning members, whereby when the rotating mechanism is turned clockwise to its limit the first magnet cooperates with the first positioning member to stabilize the position of the generated laser beam and when the rotating mechanism is turned counterclockwise to its limit the second magnet cooperates with the second positioning member to stabilize the position of the laser beam.

14. The laser generating device of claim 10, wherein the housing has a leveling bubble.

15. A laser generating device comprising:
a housing having a base;
a magnet connected to the base of the housing;
a laser generator assembly disposed within the housing for projecting a fan-shaped laser beam onto a workpiece to form a line;
a rotating mechanism coupled to the laser generator assembly for rotating the line; and
a stop that cooperates with the rotating mechanism such that when the rotating mechanism is turned clockwise to its limit the line on the workpiece has an angle of 0 degrees with a reference line and when the rotating mechanism is turned counter-clockwise to its limit the line on the workpiece forms an angle of 90 degrees with the reference line.

16. The laser generating device of claim 15, wherein the rotating mechanism provides for rotating the laser line from 0 degrees to 90 degrees with respect to the bottom of the housing.

17. The laser generating device of claim 15, wherein a retractable door is disposed over the opening and is moveable from a first open position to a second closed position, wherein when the door is in the first open position the switch is connected to the power supply for the laser generator and when the door is in the second closed position the switch is disconnected to the power supply for the laser generator.

18. An assembly for generating a laser line, the assembly comprising:
a housing having an opening, a laser generator and a power supply in the housing, the laser generator being rotatable coupled to the housing and being operable to project a laser beam through the opening in the housing and onto a workpiece to form a line, and the laser generator being electrically connected to the power supply; and
a rotating mechanism having a first stop which prevents rotation of the rotating mechanism in one direction and defines a first operating position wherein the line on the workpiece forms a first angle with a reference line and a second stop which prevents rotation of the rotating mechanism in another direction and defines a second operating position wherein the line of the workpiece forms a second angle with the reference line, the first angle being different from the second angle.

19. The assembly of claim 18, further comprising a door at the opening of the housing, the door moving from a first position to a second position to close the opening, the laser generator generating the laser beam when the door is in the first position, and the laser generator not generating the laser beam when the door is in the second position.

20. The assembly of claim 19, further comprising a switch to electrically connect and disconnect the supply of power from the power supply to the laser generator, and wherein the switch is controlled by the door.

21. The assembly of claim 18, further comprising a knob connected to the laser generator to rotate the laser generator about the housing.

22. The assembly of claim 21, wherein the knob extends outwardly from the housing.

23. The assembly of claim 18, further comprising a magnet connected to the assembly to assist in connecting the housing to the mounting baseplate.

24. A laser level, comprising:
a laser generator assembly having a laser generator and a lens;
a housing with a base defining a base plane;
a power supply electrically connected to the laser generator;
a switch between the laser generator and the power supply for selectively powering the laser generator;
the laser generator projecting a laser beam through the lens to form a line on a surface to be illuminated;
a manually operated rotating mechanism operable on one of either the laser generator or the lens to selectively adjust the line on the surface to be illuminated from an angle between 0 and 90 degrees with the base plane; and
at least one stop which stops the rotating mechanism from adjusting the line on the surface beyond one of either an angle of 0 degrees or 90 degrees with the base plane.

25. The laser level of claim 24 wherein the line is adjustable from a vertical positioning reference on the surface to be illuminated to a horizontal positioning reference on the surface to be illuminated.

26. The laser level of claim 24, wherein the rotating mechanism transfers rotation to the laser generator as a portion of the rotating mechanism is rotated.

27. The laser level of claim 24, wherein the laser generator is located within a housing.

28. The laser level of claim 24 further comprising a removable mounting baseplate having an attachment which cooperates with the laser level to removably secure the laser level to the mounting baseplate, the laser generator being rotatable with respect to the mounting baseplate when the laser level is secured to the mounting baseplate.

29. The laser level of claim 28, wherein the mounting baseplate has an opening to receive a pin for securing the mounting baseplate to a surface.

30. The laser level of claim 29, wherein the mounting baseplate comprises a retractable pin.

31. A laser level, comprising:
a laser generator supported by a base;
a power supply connected to the laser generator;
a laser beam projected from the laser generator through a lens to form a line on a surface to be illuminated;

a rotating mechanism operable on the line to angularly adjust the line from 0 to 90 degrees with respect to a reference line on the surface to be illuminated; and the rotating mechanism including a stop that cooperates with a fastening member to stabilize the line at one of either 0 degrees or 90 degrees on the surface to be illuminated.

32. A laser level, comprising:

a laser generator supported by a base;

a power supply connected to the laser generator;

a laser beam projected from the laser generator;

an adjustable laser projection line selectively adjustable on a surface to be illuminated from a line at 0 degrees with respect to a reference line and to a line at 90 degrees with respect to the reference line while maintaining the laser level in a fixed position on a fixed plane; and a fastening member and a magnet that cooperate with one another to maintain the stability of the laser line at 0 degrees and at 90 degrees.

33. A laser level, comprising:

a laser generator assembly comprising a laser generator and a lens;

a power supply connected to the laser generator;

a fan-shaped laser beam projected from the laser generator assembly and forming a line on a surface to be illuminated; and a manually rotating mechanism operable on the laser generator assembly to selectively adjust the line on the surface to be illuminated, the manually rotating mechanism having a first stop that defines a first position wherein the line on the surface to be illuminated forms a reference angle of 0 degrees and a second stop that defines a second position wherein the line on the surface to be illuminated has an angle of 90 degrees.

34. A laser level, comprising:

a housing having a first level bubble aligned along a first plane and a second level bubble aligned along a second plane generally perpendicular to the first plane;

a laser generating assembly for projecting a fan-shaped laser beam to form a line on a surface to be illuminated, the laser generating assembly comprising a laser generator and a lens;

a power supply electrically connected to the laser generator; and a member projecting outwardly from the housing, the member being moveable between a first position wherein the member is rotated counter-clockwise to its limit and the line on the surface to be illuminated is one of either horizontal or vertical, and a second position wherein the member is rotated clockwise to its limit and the line on the surface to be illuminated is the other of either horizontal or vertical.

35. A line generating assembly, comprising:

a housing having a base;

a power supply;

a laser generator electrically connected to the power supply and positioned inside the housing, the laser generator projecting a laser beam through a lens, the lens being manually rotatable with respect to the base of the housing from a first position wherein a first stop prevents further rotation of the lens in a first direction and the laser generator projects a vertical line on a surface to be illuminated to a second position wherein a second stop prevents further rotation of the lens in a second direction which is opposite of the first direction and the laser generator projects a horizontal line on the surface to be illuminated.

* * * * *